(12) United States Patent
Wang et al.

(10) Patent No.: US 12,156,195 B2
(45) Date of Patent: Nov. 26, 2024

(54) VIRTUAL USER EQUIPMENT WITH DATA AGGREGATION

(71) Applicant: GOOGLE LLC, Mountain View, CA (US)

(72) Inventors: Jibing Wang, San Jose, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 392 days.

(21) Appl. No.: 17/787,073

(22) PCT Filed: Nov. 24, 2020

(86) PCT No.: PCT/US2020/062019
§ 371 (c)(1),
(2) Date: Jun. 17, 2022

(87) PCT Pub. No.: WO2021/126493
PCT Pub. Date: Jun. 24, 2021

(65) Prior Publication Data
US 2023/0038999 A1  Feb. 9, 2023

Related U.S. Application Data

(60) Provisional application No. 62/949,689, filed on Dec. 18, 2019.

(51) Int. Cl.
*H04W 72/12* (2023.01)
*H04W 72/04* (2023.01)
(Continued)

(52) U.S. Cl.
CPC ......... *H04W 72/121* (2013.01); *H04W 72/23* (2023.01)

(58) Field of Classification Search
None
See application file for complete search history.

(56) References Cited

U.S. PATENT DOCUMENTS

2012/0113950 A1  5/2012  Skov et al.
2012/0114050 A1  5/2012  Osterling
(Continued)

FOREIGN PATENT DOCUMENTS

CN  108141729 A  6/2018
EP  2 869 478 A1  5/2015
(Continued)

OTHER PUBLICATIONS

Examination Report in corresponding Indian Application No. 202247038325 dated Oct. 18, 2022.
(Continued)

*Primary Examiner* — Hong Shao
(74) *Attorney, Agent, or Firm* — PATENT PORTFOLIO BUILDERS PLLC

(57) ABSTRACT

A base station (BS) supporting a protocol stack can implement a method for increasing network efficiency. The method includes transmitting (202), to at least a first user equipment (UE), a group identity for a group of two or more UEs that includes the first UE. The method further includes generating (302), by processing hardware of the base station and using the group identity, a data signal that includes aggregated downlink data. The aggregated downlink data includes (i) a UE-specific identity for at least two target UEs within the group and (ii) for each target UE of the at least two target UEs, a respective UE-specific identity, at an upper layer of the protocol stack, that indicates a location of the UE-specific downlink data intended for the target UE within the aggregated downlink data. The method further includes transmitting (306) the data signal to at least a portion of the group via a downlink data channel.

20 Claims, 7 Drawing Sheets

(51) Int. Cl.
*H04W 72/121* (2023.01)
*H04W 72/23* (2023.01)

(56) References Cited

U.S. PATENT DOCUMENTS

| | | |
|---|---|---|
| 2013/0039297 A1 | 2/2013 | Wang |
| 2013/0078991 A1 | 3/2013 | Nam |
| 2013/0114656 A1 | 5/2013 | Sayana et al. |
| 2013/0258965 A1 | 10/2013 | Geirhofer et al. |
| 2015/0111519 A1 | 4/2015 | Li et al. |
| 2015/0117377 A1 | 4/2015 | Maaref et al. |
| 2015/0200754 A1 | 7/2015 | Sayana et al. |
| 2015/0230284 A1 | 8/2015 | Nimbalker et al. |
| 2016/0295621 A1 | 10/2016 | Han et al. |
| 2016/0337485 A1 | 11/2016 | Nuggehalli et al. |
| 2016/0373970 A1 | 12/2016 | Kulal |
| 2017/0078011 A1 | 3/2017 | Kim et al. |
| 2017/0310375 A1 | 10/2017 | Kim et al. |
| 2018/0092070 A1 | 3/2018 | Liao et al. |
| 2019/0082428 A1 | 3/2019 | Maaref et al. |
| 2019/0124633 A1 | 4/2019 | Hang et al. |
| 2019/0208539 A1 | 7/2019 | Christoffersson et al. |
| 2019/0312616 A1 | 10/2019 | Christoffersson et al. |
| 2020/0092685 A1 | 3/2020 | Fehrenbach et al. |
| 2020/0367101 A1 | 11/2020 | Paladugu et al. |

FOREIGN PATENT DOCUMENTS

| | | |
|---|---|---|
| EP | 2 999 287 A1 | 3/2016 |
| EP | 3425936 A1 | 1/2019 |
| WO | WO-2016/120686 A1 | 8/2016 |
| WO | WO-2017/148173 A1 | 9/2017 |
| WO | WO-2018/202798 A1 | 11/2018 |
| WO | WO-2020/078381 A1 | 4/2020 |
| WO | WO-2020/150997 A1 | 7/2020 |

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.5.0 (Mar. 2019), pp. 1-58.
Cooperative Access among UEs in Cellular Networks. Waseda University, 2015.
International Search Report and Written Opinion for Application No. PCT/US2020/062019, dated Feb. 26, 2021.
R1-091835. Texas Instruments, May 4-8, 2009 (Retrieved from https://www.3gpp.org/ftp/tsg_ran/WG1_RL1/TSGR1_57/Docs/).
Understanding the Standards for LTE-Advanced Enhancements 2016 Update (retrieved from: <https://www.5gamericas.org/wp-content/uploads/2019/07/Inside_3GPP_Release_13_Understanding_the_Standards_for_LTE_Advanced_Enhancements_Final.pdf>).
3GPP TSG-RAN WG2 NR AH#2 R2-1706681 Qingdao, P.R. China, Jun. 27-29, 2017, "Logical Channel Selection Restrictions in LCP," InterDigital Inc., pp. 1-4.
Examination Report in corresponding Chinese Application No. 202080092049.8 dated Jul. 17, 2024.

VIRTUAL USER EQUIPMENT WITH DATA AGGREGATION

FIELD OF THE DISCLOSURE

This disclosure relates generally to wireless communications and, more particularly, to grouping strategies for coordinating user devices in wireless communication systems.

BACKGROUND

In wireless communication systems, such as fifth-generation (5G) radio access ("NR") networks, a base station (e.g., a gNB) must configure downlink and uplink transmissions to and from user devices within the base station's coverage area. To perform this configuration, the base station transmits control information indicating random access channel information, scheduling grants, power control commands, coding information, etc. via a control channel. However, handling the configuration of a large number of user devices can require extensive control channel overhead (e.g., time and frequency resources), leading to a reduction in network efficiency.

Further, the signal strength at the location of a particular user device (commonly referred to as a user equipment ("UE")) and/or the reception capability of a particular UE may be poor. For example, the UE may be located at a cell edge or experiencing fading effects due to Doppler shift, multipath propagation, or shadowing. The base station may struggle to establish communication with the UE, further diminishing overall network efficiency.

To address some of these issues, various schemes for coordination (or "grouping") among different UEs have been proposed. Despite these various schemes, there are further opportunities to capture more of the network efficiency improvements that UE groupings can offer, and to flexibly scale coordination schemes to support arbitrarily large UE group sizes.

SUMMARY

According to techniques of this disclosure, a number of UEs form a group (referred to herein as a "UE Coordination Set" or "UECS")) that a base station views—at least in some respects and at some protocol stack layers—as a single UE. The base station transmits a group identity (referred to herein as a UECS-RNTI) to a coordinating or "master" UE of the UECS, which may distribute the UECS-RNTI to one or more other UEs in the UECS via a local wireless network. The UECS-RNTI provides a physical (PHY) layer identity for the UECS, which the UECS can use to process information within control and data signals that are intended for the UE group.

The base station generates a control signal for the UECS, and transmits the control signal to the UECS on a single control channel (e.g., a Physical Downlink Control Channel (PDCCH)). The control signal includes downlink control information (DCI) that specifies time and frequency resources that the UECS can use to transmit data on an uplink data channel, and receive data on a downlink data channel. When generating the control signal, the base station scrambles a cyclic redundancy check (CRC) using the UECS-RNTI, and includes the scrambled CRC with the DCI.

Different UEs in the UECS receive the same control signal, with the UECS effectively operating as a distributed antenna receiver (i.e., with one or more antennas of the distributed antenna arrangement residing at each UE). Each UE that receives the control signal demodulates the control signal to generate I/Q samples, and transmits the I/Q samples to a designated UE, of the UECS, that acts as a "joint-receiver" UE.

The joint-receiver UE (e.g., the master UE, or another UE that the master UE assigns to the joint-receiver role) receives and jointly processes the I/Q samples. Specifically, the joint-receiver UE time-aligns and consolidates the I/Q samples, thereby obtaining a stronger combined signal. The processing by the joint-receiver UE may include decoding of the DCI using the UECS-RNTI (e.g., by using the UECS-RNTI to de-scramble the CRC). In some implementations, the joint-receiver UE then transmits the decoded DCI to the other UEs in the UECS. In other implementations, the joint-receiver UE transmits the decoded DCI to the master UE, which then distributes the decoded DCI to the other UEs in the UECS.

When the base station has data to send to one or more UEs in the UECS, the base station aggregates individual downlink data flows for the UEs to form an aggregated downlink data flow for the UECS. The base station distinguishes the downlink data for each UE in the UECS using a specific identity for that UE. Each such UE identity is specific to a layer that is above the PHY layer in the protocol stack, and the base station aggregates the data flows at that upper layer. For example, the upper layer may be a radio link control (RLC) layer, a packet data convergence protocol (PDCP) layer, or a medium access control (MAC) layer. The base station may also, at a lower layer, scramble a CRC using the UECS-RNTI, and include the scrambled CRC with the aggregated data flows.

After aggregating the UE-specific downlink data flows, the base station transmits a data signal including the aggregated downlink data (and possibly a scrambled CRC) to the UECS. The UECS, still operating as a distributed antenna receiver, jointly receives the data signal in a manner similar to the control signal, e.g., with one or more UEs of the UECS forwarding their I/Q samples to the joint-receiver UE. After receiving, time-aligning, and consolidating the I/Q samples, the joint-receiver UE decodes the aggregated downlink data (e.g., including using the UECS-RNTI to de-scramble the CRC).

The downlink data for each individual UE may be extracted in a variety of ways, depending on the implementation and/or scenario. The joint-receiver UE may coordinate distribution of the downlink data, or the joint-receiver UE may instead forward the aggregated downlink data to the master UE for distribution. In some implementations, the distributing UE (whether the joint-receiver UE or the master UE) extracts the downlink data for each UE, at the upper layer, using the respective upper-layer UE identity for that UE, and then transmits the extracted data to the UE using a local wireless network. In other implementations, the distributing UE extracts only its own data, using its own upper-layer UE identity, and then forwards the remaining aggregated data to the other UEs, which extract their own data using their own respective upper-layer UE identities. In one implementation, the distributing UE extracts its own data and forwards the remaining aggregated data to just one other UE, which extracts its own data and forwards the remaining aggregated data to another UE, etc., until no data remains. Other techniques are also possible, such as the distributing UE forwarding all of the aggregated data to the other UEs (without first removing its own data), or the distributing UE forwarding particular subsets of UE-specific data to certain (e.g., in-near-range) UEs, while transmitting the remainder of the aggregated downlink data to the UECS as a whole (e.g., to any UEs of the UECS that are currently within local wireless range of the distributing UE).

Further, the base station may configure the UECS to share the same state with respect to a radio resource control (RRC) layer, and to share the same discontinuous reception (DRX) cycle, semi-persistent scheduling, and/or bandwidth part.

As noted above, the UECS may function as a distributed antenna, and therefore have multiple antenna ports. In some implementations, the control signal includes antenna port definitions determined by the base station. The base station may determine a first antenna port for a first UE in the UECS and a second antenna port for a second UE in the UECS, for example, by differentiating the antenna ports with the upper-layer, UE-specific identity discussed above. Using these antenna port definitions, the base station may send each UE its own power control and/or timing advanced command, and/or configure each UE to have its own channel sounding process, for example.

In some implementations, the base station schedules both aggregated downlink data and aggregated uplink data via the control channel (e.g., PDCCH) for the UECS. For uplink transmissions, individual UEs in the UECS may transmit their individual uplink data flows with their respective UE-specific identities to the master UE via a local wireless network. The master UE may aggregate the data at the upper layer including the UE-specific identity with its respective data. In some implementations, prior to transmission to the base station, the master UE prioritizes the aggregation of the uplink data from each UE according to the Quality of Service (QoS) level associated with that data. The master UE may then transmit an uplink data signal including the aggregated uplink data to the base station (e.g., via a PUSCH occasion that the base station granted to the UECS, or obtained via a random access procedure), or may first transmit the uplink data signal to the other UEs in the UECS to facilitate joint transmission of the uplink data to the base station, with the UECS operating as a distributed antenna transmitter.

One example embodiment of these techniques is a method, in a base station supporting a protocol stack, for increasing network efficiency. The method includes transmitting, to at least a first UE, a group identity for a group of two or more UEs that includes the first UE. The method also includes generating, by processing hardware of the base station and using the group identity, a data signal that includes aggregated downlink data. The aggregated downlink data includes (i) UE-specific downlink data for at least two target UEs within the group and (ii) for each target UE of the at least two target UEs, a respective UE-specific identity, at an upper layer of the protocol stack, that indicates a location of the UE-specific downlink data intended for the target UE within the aggregated downlink data. The method further includes transmitting the data signal to at least a portion of the group via a downlink data channel.

Another example embodiment of these techniques is a base station comprising hardware and configured to implement the method above.

An additional embodiment of these techniques is a method, in a first UE supporting a protocol stack, for increasing network efficiency. The method includes receiving, from a wireless transmitter, a group identity corresponding to a group of two or more UEs that includes the first UE and a second UE. The method also includes receiving, from a base station on a downlink data channel, a data signal including aggregated downlink data. The aggregated downlink data includes (i) UE-specific downlink data for at least two target UEs within the group and (ii) for each target UE of the at least two target UEs, a respective UE-specific identity, at an upper layer of the protocol stack, that indicates the location of the UE-specific downlink data intended for the target UE within the aggregated downlink data. The method further includes generating, by processing hardware of the first UE, first I/Q samples by demodulating the received data signal and receiving, from the second UE via a local wireless network, second I/Q samples corresponding to the data signal as received by the second UE. Still further, the method includes decoding, by the processing hardware, the aggregated downlink data by processing at least the first I/Q samples and the second I/Q samples using the group identity.

Another example embodiment of these techniques is a UE comprising hardware and configured to implement the method above.

DETAILED DESCRIPTION OF THE DRAWINGS

Figure 1:
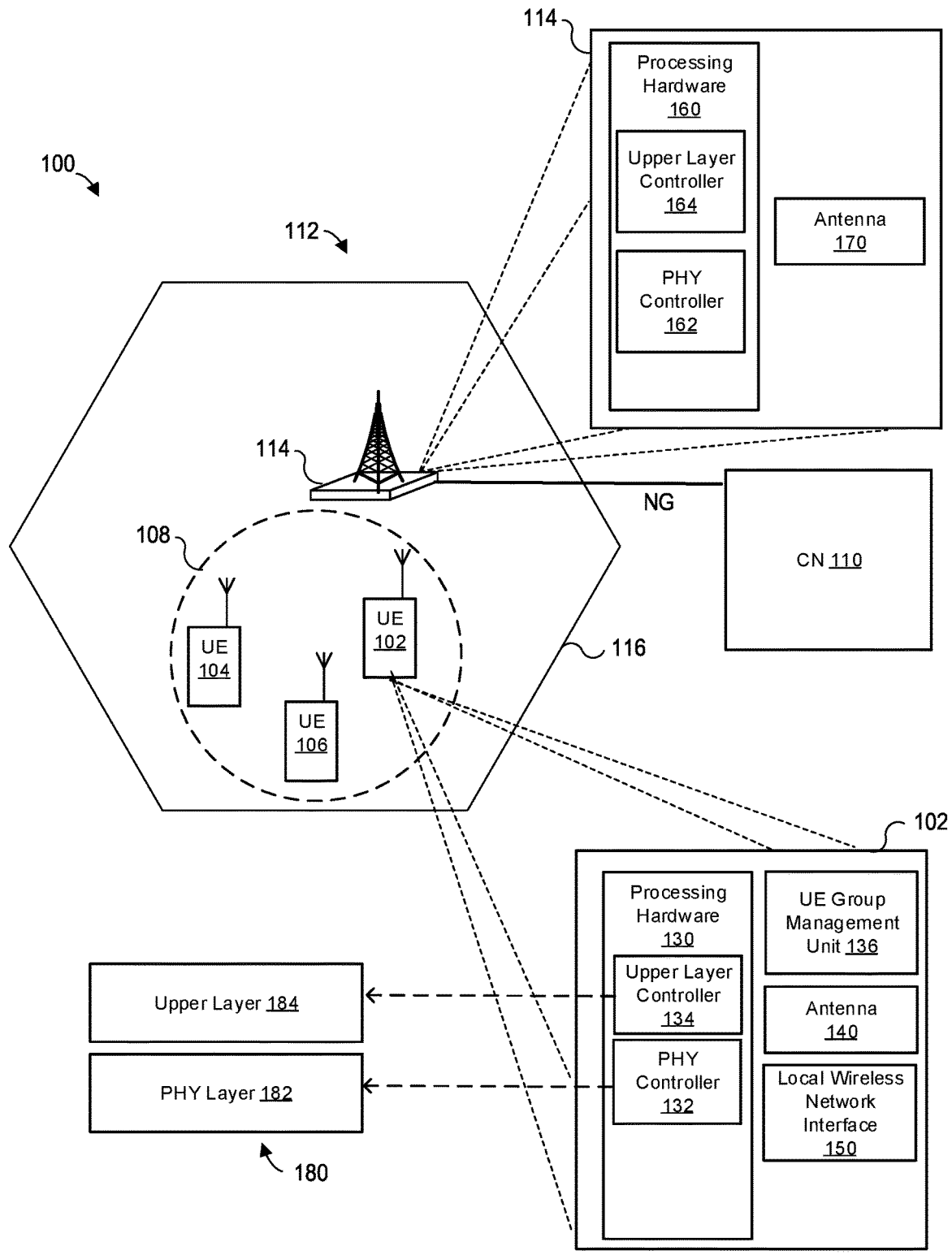
FIG. 1 illustrates an example communication system in which aggregation and disaggregation techniques for a User Equipment Coordination Set (UECS) of this disclosure can be implemented.

FIG. 1 illustrates an example communication system 100 in which data aggregation and disaggregation techniques for a User Equipment Coordination Set (UECS) of this disclosure, and related control procedures, can be implemented. The communication system 100 includes a number of user equipment (UEs), including UE 102, UE 104, and UE 106. Each of UEs 102, 104, and 106 can be any suitable device capable of wireless communication (e.g., any of the exemplary user devices discussed below, after the description of the figures). In the depicted scenario, the UEs 102, 104, and 106 form a UE group 108, also referred to herein as a UECS 108. While FIG. 1 depicts three UEs, the UECS 108 may include any number (greater than one) of UEs. The UECS 108 can locally coordinate uplink (UL) transmission and downlink (DL) reception to and from a base station 114, using techniques described in further detail below.

The base station 114 is communicatively connected to a core network (CN) 110 via an NG interface, for example. In some implementations, the base station 114 is a 5G New Radio (NR) base station operating as a g Node B (gNB), and the CN 110 is a 5G core network (5GC). In other implementations, however, the communication system 100 can include one or more base stations that operate according to radio access technologies (RATs) of types other than NR, and these base stations can be connected to CNs of other types. The CN 110 can be, for example, a 5G core network (5GC), a less advanced core network (e.g., an evolved packet core (EPC)), or, conversely, a more advanced core network.

The base station 114 is associated with a RAN 112 and provides coverage to a cell 116. While FIG. 1 depicts the base station 114 as associated with only one cell 116, it is understood that the base station 114 may also cover one or more additional cells not shown in FIG. 1. Further, the RAN 112 can include any suitable number of base stations that collectively support one or more RATs. Each UE, such as the UE 102, can communicatively connect with the RAN 112 via the base station 114 when operating within the cell 116, and in turn can communicatively connect with the CN 110 via the RAN 112.

The UE 102 is equipped with at least processing hardware 130, a UE group management unit 136, at least one antenna 140, and a local wireless network interface 150. While FIG. 1 depicts only the UE 102 as including the processing hardware 130, the UE group management unit 136, the antenna 140, and the local wireless network interface 150, it is understood that each of UEs 104 and 106 also include the same or similar elements. The processing hardware 130 can include one or more general-purpose processors (e.g., CPUs) and at least one non-transitory computer-readable memory storing instructions executable on the one or more general processors and/or special-purpose processing units, such as a wireless communication chipset.

The processing hardware 130 includes a physical (PHY) layer controller 132. The PHY layer controller 132 is responsible for internal procedures at a PHY layer 182 of a wireless communication protocol stack 180, such as demodulating and decoding downlink control and data signals received from a base station (e.g., base station 114), encoding and modulating uplink control and data signals, and so on.

The processing hardware 130 also includes an upper layer controller 134. The upper layer controller 134 is responsible for internal procedures at a corresponding upper layer 184 above the PHY layer 182 of the protocol stack 180, such as aggregating uplink data and disaggregating downlink data for the UECS 108. The upper layer 184 may be, for example, a medium access control (MAC) layer, a packet data convergence protocol (PDCP) layer, or a radio link control (RLC) layer. For example, the upper layer controller 134 may support channel access, addressing, quality of service (QoS) and other functions of a MAC layer, user plane data transfer, control plane data transfer, integrity protection and other functions of a PDCP layer, or segmentation and other functions of an RLC layer. While not shown in FIG. 1, the processing hardware 130 may also include a controller for each of a number of other layers, such as a Radio Resource Control (RRC) controller and a mobility management (MM) controller associated with RRC and MM layers of the protocol stack 180, respectively.

The UE group management unit 136 of the UE 102 is generally responsible for functions related to UE grouping functions, such as sharing signals with the other UEs of the UECS 108 (e.g., UEs 104 and 106) as discussed further below. The UEs of the UECS 108 may communicate with each other over at least one local wireless network, which is not depicted in FIG. 1. The local wireless network may correspond to a personal area network (PAN), near-field communication (NFC), Bluetooth™, wireless local area network (WLAN), or any other suitable communication standard(s) or protocol(s). The local wireless network interface 150 of the UE 102 generally facilitates communications with the other UEs of the UECS 108 on the local wireless network. The UE group management unit 136 may be jointly implemented by the processing hardware 130 and the local wireless network interface 150, or may be implemented by another controller of the UE 102 that is not shown in FIG. 1.

The base station 114 includes at least one antenna 170 to communicate with the other elements of the communication system 100. The base station 114 also includes processing hardware 160, which can include one or more general-purpose processors (e.g., CPUs) and at least one non-transitory computer-readable memory storing instructions executable on the one or more general processors and/or special-purpose processing units, such as a wireless communication chipset. Similar to the processing hardware 130 of the UE 102, the processing hardware 160 can include a PHY layer controller 162 and an upper layer controller 164 corresponding to the PHY layer 182 and upper layer 184, respectively, of the protocol stack 180. Controllers 162 and 164 may perform similar or corresponding functions as controllers 132 and 134, but from the perspective of the base station 114 rather than the UE 102. For example, the PHY layer controller 162 may encode and modulate downlink control and data signals transmitted to the UECS 108, and the upper layer controller 164 may aggregate downlink data for the UECS 108 and disaggregate uplink data received from the UECS 108.

The upper layer controllers 134 and 164, PHY layer controllers 132 and 162, and UE group management unit 136 can each be implemented using any suitable combination of hardware, software, and/or firmware. In one example implementation, the controllers 132, 162, 134, and 164 and/or the UE group management unit 136 are a set of instructions that the respective processing hardware 130 or 160 executes to perform the various functions described herein.

As noted above, the UE 102 includes at least one antenna 140, for receiving signals transmitted to the UE 102 and transmitting signals from the UE 102. The UE 102 may be equipped with multiple antennas 140 to support multiple-input, multiple-output (MIMO) communications, or with only a single antenna 140. For example, the UE 102 may have two transmit-receive antennas to support two simultaneous transmission/reception paths, or may have separate transmit and receive antennas, etc. As discussed further below, the base station 114 (e.g., the PHY controller 162) may determine an antenna port at the PHY layer 182 for each physical antenna 140 of the UE 102.

Initially, as noted above, the UEs 102, 104, and 106, and possibly other UEs not depicted in FIG. 1, form the UECS 108. The UECS 108 may be formed in a variety of ways, depending on the implementation and/or scenario. In some implementations, for example, UEs can locally coordinate with each other, with little or no input from the base station 114, to form the UECS 108. The UEs 102, 104, and 106 can choose to coordinate with each other based on, for example, their respective distances from each other, and/or based on other suitable factors. The UEs 102, 104 and 106 may jointly select a coordinating or "master" UE from among the UEs 102, 104 and 106, for example, based on the relative processing capabilities of the UEs 102, 104 and 106 and/or other factors (e.g., proximity to the base station 114).

In other implementations, the base station 114 directs or partially directs formation of the UECS 108. The base station 114, for example, detects the UEs 102, 104, and 106 within the cell 116, and assigns each UE to the UECS 108. The base station 114 may also request that the UEs 102, 104 and 106 form the UECS 108, and only assign a particular UE to the UECS 108 if that UE responds with an acknowledgement and/or approval of the request. The base station 114 may select UEs for the UECS 108 based on the location of each UE relative to the base station 114 and to the other UEs, and/or other factors. The base station 114 may also select certain UEs for the UECS 108 depending on beam scheduling, for example, with the base station 114 only selecting UEs that are in the same beam. The base station 114 may also select which single UE is to function as the master UE of the UECS 108.

In any of these cases (i.e., the UEs locally coordinating to form the UECS 108, the base station 114 forming the UECS 108, or a hybrid thereof), the base station 114 generates and transmits a group identity to the UECS 108. The UECS 108 can use the group identity to decode control and data signals that the base station 114 directs to the UECS 108, as discussed in further detail below. In some implementations, the group identity is a PHY layer 182 identity for the UECS 108. The group identity is referred to herein as a UECS-RNTI, where "RNTI" refers to a Radio Network Temporary Identifier.

Conventionally, a base station may use an RNTI such as a cell RNTI (c-RNTI) to identify an individual UE. In contrast, the techniques disclosed herein specify a UECS-RNTI that the base station 114 and the UECS 108 can use, in some implementations, in the same manner as a c-RNTI, but for the UECS 108 as a whole rather than any individual UE. With the UECS-RNTI, and regardless of whether the UECS-RNTI operates as a c-RNTI for the UECS 108, operates similarly to some other conventional RNTI, or is not analogous to any conventional RNTI, the base station can treat (e.g., communicate with, configure, etc.) the UECS 108 as a single UE.

Allowing the base station to treat the UECS 108 as a single UE has numerous technical advantages. For example, the base station 114 can transmit control signals to the UECS 108 on a single control channel, transmit data signals to the UECS 108 on a single downlink data channel, and receive data signals from the UECS on a single uplink data channel. Moreover, because the base station 114 views the UECS 108 as a single UE, the base station 114 can aggregate downlink data flows of individual UEs into a single downlink data flow for the UECS 108, thereby reducing channel overhead (e.g., scheduling and other control functions). The base station 114 can also associate the aggregated downlink data to only one data radio bearer (DRB) for the UECS 108.

The base station 114 may further reduce channel overhead by configuring the UECS 108 (and consequently the individual UEs of the UECS 108) to have a single RRC layer state, which can reduce the amount of control signaling at the RRC layer (i.e., fewer RRC messages exchanged between the base station 114 and individual UEs). Additionally or alternatively, the base station 114 may reduce channel overhead by configuring the UECS 108 to have a single discontinuous reception (DRX) cycle, a single semi-persistent scheduling (SPS) configuration, and/or a single bandwidth part (BWP) for uplink and/or downlink communications. Thus, the UEs of the UECS 108 may all share the same RRC layer state, DRX cycle, SPS configuration, and/or BWPs (uplink and/or downlink).

In addition to reduced channel/signaling overhead, the grouping of UEs into the UECS 108 may also result in other advantages. In some implementations, for example, the UECS 108 can jointly receive downlink control and data signals from the base station 114, and jointly transmit uplink control and data signals to the base station 114. Because each UE of the UECS 108 is equipped with at least one antenna (e.g., the antenna 140 of the UE 102), the UECS 108 can utilize the antennas of the individual UEs as a distributed antenna arrangement for both reception and transmission. Accordingly, the UECS 108 can have reception and transmission capabilities that exceed those of the individual UEs 102, 104, and 106. In addition, if one UE of the UECS 108 experiences poor reception, that UE may rely on the other UEs of the UECS 108 to receive information from the base station 114 and forward that information to the UE with poor reception. Further, the UECS 108 can leverage the combined processing power of the UEs 102, 104, and 106 to demodulate data and control signals, thereby improving reception for the UECS 108 as a whole.

The master UE may function as a "joint-receiver" UE to perform the functions necessary to facilitate joint reception, or the master UE may delegate that responsibility by assigning another UE to be the joint-receiver UE. In some implementations, the base station 114 directs the master UE to select a joint-receiver UE, or directly assigns the joint-receiver UE. In other implementations, the master UE selects a joint-receiver UE with little or no input from the base station. The master UE may change which UE acts as the joint-receiver UE depending on changing power and reception conditions and/or capabilities of the UEs in the UECS 108. Regardless of how the joint-receiver UE is selected, or re-assigned, the joint-receiver UE may facilitate joint reception using any of the various techniques described below with respect to FIGS. 2-4.

As noted above, the base station 114 can aggregate downlink data to send the UECS 108 using a data signal on a single downlink data channel. To accomplish this, the base station 114 aggregates the downlink data at the upper layer 184 of the protocol stack 180 using UE-specific identities. After jointly receiving (e.g., decoding) the aggregated downlink data, the UECS 108 utilizes these UE-specific identities to disaggregate the aggregated downlink data. The UECS 108 may also use the same UE-specific identities to aggregate UE-specific uplink data that is intended for the base station 114. Different techniques that the UECS 108 may utilize to disaggregate and distribute downlink data, and to aggregate and transmit uplink data, are discussed below with reference to FIGS. 2-5.

Next, various example implementations and scenarios reflecting the techniques described above are discussed with reference to FIGS. 2-7. While FIGS. 2-7 and the accompanying descriptions refer specifically to the UEs 102, 104, 106, the UECS 108, and the base station 114 of FIG. 1, it is understood that the following techniques may be implemented by other components and/or in systems other than the communication system 100 of FIG. 1.

Figure 2:
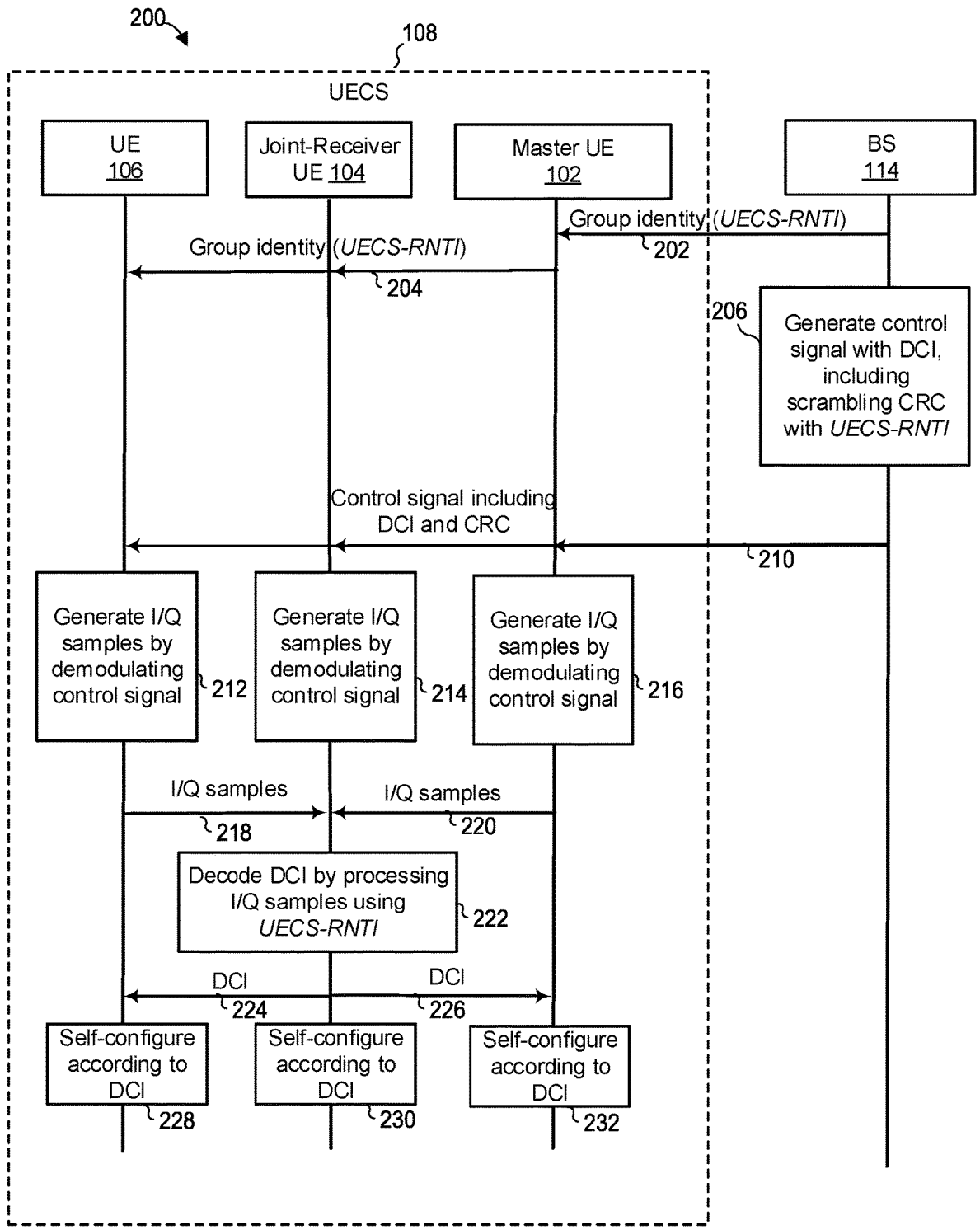
FIG. 2 is a messaging diagram of an example scenario in which the base station transmits a control signal to the UECS on a single downlink control channel.

FIG. 2 is a messaging diagram of a first example scenario 200 in which the base station 114 sends the UECS 108 a control signal containing downlink control information (DCI) on a single control channel (e.g., a PDCCH). In the example scenario 200, the UE 102 is acting as the master UE of the UECS 108, the UE 104 is acting as the joint-receiver UE 104 of the UECS 108, and the UE 106 is another UE in the UECS 108 that is neither the master nor the joint-receiver. It is understood that, in other scenarios, the UE 102, 104 and/or 106 can have other roles within the UECS 108. Moreover, in some scenarios and/or implementations, the master UE 102 does not assign a joint-receiver UE, and instead itself performs the joint-reception functions.

The example scenario 200 begins after the UECS 108 has already formed, and when the base station 114 transmits 202 a group identity (UECS-RNTI) to the master UE 102. In other implementations, the base station 114 triggers the formation of the UECS 108 by transmitting 202 the UECS-RNTI to the UE 102. After receiving the UECS-RNTI, the master UE 102 transmits 204 the UECS-RNTI to the joint-receiver UE 104 and the UE 106 via a local wireless network (e.g., the local wireless network discussed above in connection with FIG. 1). In some implementations and/or scenarios where the joint-receiver UE 104 is the only UE of UECS 108 that is responsible for decoding downlink data and control information using the UECS-RNTI (as discussed below), the master UE 102 only transmits the UECS-RNTI to the joint-receiver UE 104. As noted above, however, the master UE 102 may reassign the joint-receiver role to another UE over time (e.g., to share the processing load in view of the fact that joint reception responsibilities of the joint-receiver UE may be power-intensive). Thus, it can be advantageous for the master UE 102 to also transmit the UECS-RNTI to the UE 106. Alternatively, the master UE 102 may transmit the UECS-RNTI to a new UE (e.g., the UE 106) only at a later time, when assigning the joint-receiver role to that new UE.

In scenarios where the master UE 102 (and possibly all UEs of the UECS 108) cannot individually receive the UECS-RNTI due to poor channel conditions, the base station 114 may not transmit (or not successfully transmit) a UECS-RNTI to the master UE 102. In such scenarios, the base station 114 does not aggregate UE-specific downlink data using the UECS-RNTI (as will be described below with reference FIGS. 3-4). However, the UECS 108 may nonetheless operate as a distributed antenna to jointly receive and jointly transmit control signal and non-aggregated data signals from and to the base station 114. Additionally, the base station 114 may, at some later time when channel conditions improve, transmit a UECS-RNTI to the master UE 102 to enable the data aggregation techniques described herein.

In scenario 200, after transmitting 202 the UECS-RNTI to the master UE 102, the base station 114 generates 206 a control signal for the UECS 108. The control signal includes downlink control information (DCI), which specifies time and frequency resources that the UECS 108 can use to transmit data on an uplink data channel and receive data on a downlink data channel. As a part of generating 206 the control signal, the base station 114 scrambles a cyclic redundancy check (CRC) for the DCI using the UECS-RNTI, and includes the scrambled CRC with the DCI in the control signal. Thus, only a UE that knows the UECS-RNTI can "de-scramble" the CRC and therefore decode the DCI.

After generating 206 the control signal, the base station 114 transmits 210 the control signal that includes the DCI and scrambled CRC to the UECS 108 via a single control channel (e.g., a PDCCH). Each UE of the UECS 108, including the master UE 102, joint-receiver UE 104, and UE 106, can receive the same control signal (channel conditions permitting), with the UECS 108 effectively operating as a distributed antenna receiver (i.e., with one or more antennas of the distributed antenna arrangement residing at each UE).

If a particular UE is experiencing problems receiving signals from the base station 114 but can still communicate with one or more other UEs in the UECS 108, other UEs of the UECS 108 may receive the control signal, process the control signal in the manner discussed below, and forward control information to that UE.

In the example scenario 200, all of the UEs 102, 104 and 106 receive the control signal transmitted 210 by the base station 114. Thus, each of the UE 106, the joint-receiver UE 104, and the master UE 102 generates (212, 214 and 216, respectively) respective I/Q samples by demodulating the received control signal. The I/Q samples represent the radio-frequency control signal after being down-converted and demodulated into its in-phase (I) and quadrature (Q) components. The UE 106 transmits 218 its I/Q samples to the joint-receiver UE 104, and the master UE 102 transmits 220 its I/Q samples to the joint-receiver UE 104, via the local wireless network.

After the joint-receiver UE 104 receives the I/Q samples from the other UEs 102, 106, the joint-receiver UE 104 decodes 222 the DCI by jointly processing the I/Q samples received from the UEs 102, 106 together with the I/Q samples that the joint-receiver UE 104 itself generated 214. To decode 222 the DCI, the joint-receiver UE 104 first time-aligns and consolidates the I/Q samples of UEs 102, 104 and 106. By consolidating the I/Q samples, the joint-receiver UE produces a linear power gain and can obtain a stronger signal compared to the signal received by any individual UE. The joint-receiver UE 104 can then decode 222 the DCI by using the UECS-RNTI to de-scramble the CRC.

In the implementation shown in FIG. 2, the joint-receiver UE 104 then distributes the decoded DCI by transmitting (224, 226) the DCI to the other UEs (106, 102) in the UECS 108 via the local wireless network. In other implementations and/or scenarios, the joint-receiver UE 104 transmits 226 the DCI to the master UE 102 but not the UE 106, and the master UE 102 then transmits the DCI to each UE in the UECS 108 (possibly excluding the joint-receiver 104), or to at least one other UE in the UECS 108 that then further distributes the DCI (e.g., forming part of a transmission chain within the local wireless network). After receiving the DCI, each of the UEs (102, 104, 106) may self-configure (228, 230, 232) according to the information in the DCI, in order to prepare to receive downlink transmissions from the base station and/or transmit uplink data via the channel(s) specified in the DCI.

In addition to the DCI, the control signal (or an additional control signal generated by the base station 104 and transmitted on the downlink control channel) may include other information, such as antenna port definitions determined by the base station 114. The base station 114 may determine a unique antenna port for each UE in the UECS 108, for example, by associating different antenna ports to different UEs using an upper layer, UE-specific identity (e.g., the same identity discussed below with respect to FIGS. 3-4). Moreover, if a UE has multiple antennas, then the base station may optionally either determine unique antenna ports for each antenna of that UE, or determine a single antenna port for some or all of the antennas of that UE. Thus, the UECS 108 may collectively function as a spatially diverse, distributed antenna that can support a relatively large number of unique antenna ports. For example, if the UEs 102, 104, and 106 each have two antennas, the base station 114 can potentially assign up to six antenna ports to the UECS 108

In the control signal transmitted 210 to the UECS 108, or in another control signal that the base station 114 transmits to the UECS 108 at a different time, the base station 114 may include various commands specific to each antenna port. These commands may include, for example, transmit power commands (for setting uplink transmit power) and/or timing advance commands (for adjusting uplink transmission timing to achieve system synchronization). When a UE receives a command of this sort that is associated with an antenna port mapped to one or more physical antennas of that UE, the UE responds accordingly (e.g., by changing or maintaining its transmit power and/or uplink transmission timing in accordance with the received command). Further, the base station 114 may define a channel sounding process configuration that is specific to each antenna port, and cause a UE associated with a particular antenna port to perform the corresponding channel sounding process. When transmitting control signals to the UECS 108, the base station 114 may indicate which command (e.g., power command, timing advance command) or configuration (e.g., channel sounding process configuration) applies to which UE by including the appropriate upper layer, UE-specific identities (and/or identifiers of the corresponding antenna ports) along with those commands or configurations.

Figure 3:
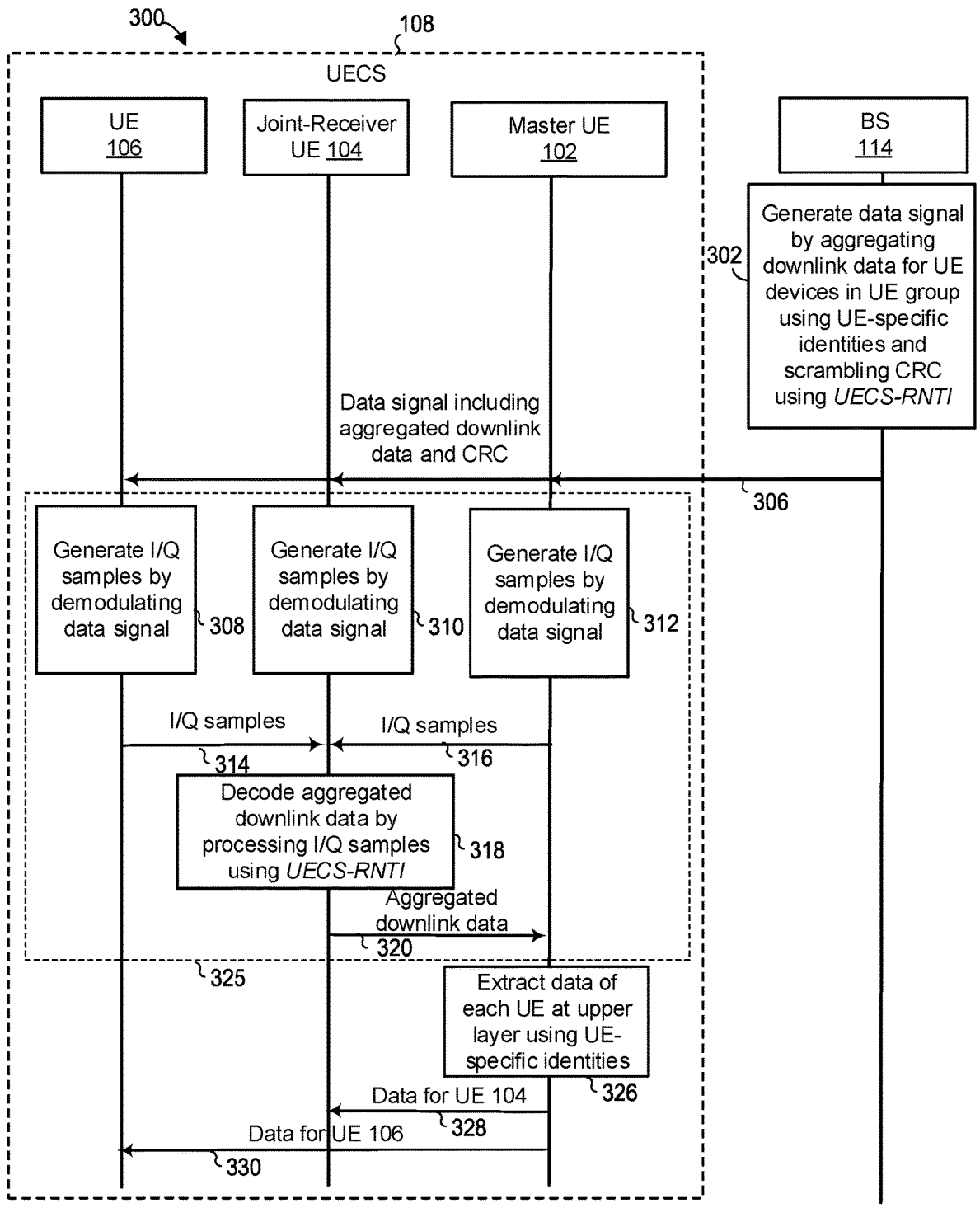
FIG. 3 is a messaging diagram of an example scenario in which the base station transmits a data signal containing aggregated downlink data to the UECS on a single downlink data channel, and the UECS self-distributes the aggregated downlink data.

FIG. 3 is a messaging diagram of an example scenario 300 in which the base station 114 transmits a data signal containing aggregated downlink data to the UECS 108 on a single downlink data channel, and the UECS 108 self-distributes the aggregated downlink data. Example scenario 300 may be performed by the UECS 108 and the base station 114 after the scenario 200 depicted in FIG. 2 (i.e., after the base station 114 transmits 210 a control signal containing a DCI to the UECS 108 and the UEs of the UECS 108 self-configure in accordance with the DCI). Scenario 300 begins when the base station 114 generates 302 a data signal including aggregated downlink data for the UECS 108. To generate 302 the aggregated downlink data for the UECS 108, the base station 114 aggregates downlink data flows for at least two target UEs in the UECS 108 (in the scenario 300, at least UEs 104 and 106) at the upper layer 184. The upper layer 184 may be a PDCP layer or an RLC layer, and the data signal may include, respectively, a PDCP protocol data unit (PDCP PDU) or an RLC PDU containing the aggregated downlink data. In other implementations, the upper layer 184 is a MAC layer, and the data signal includes a MAC PDU containing the aggregated downlink data.

The base station 114 indicates the location of the downlink data for each target UE, within the aggregated downlink data, using a UE-specific identity for that target UE. For example, the base station 114 can include each UE-specific identity immediately before the data that is intended for the target UE associated with that UE-specific identity. The UE-specific identities may be identities dedicated to distinguishing the UEs at the upper layer 184 (i.e., the layer at which the base station 114 aggregates the downlink data). In some implementations, the base station 114 generates the UE-specific identities. In other implementations, the individual UEs determine their own UE-specific identities, and transmit those identities to the base station 114, or to the master UE 102, which then forwards the identities to the base station 114. In still other implementations, the master UE 102 assigns UE-specific identities to each UE, and transmits these assigned UE-specific identities to the base station 114. The UE-specific identities may be long enough to provide unique identities for a suitable number of UEs in the UECS 108 (e.g., 4, 8, 16, etc.), or may be of variable length, thus allowing for a scalable method of identifying UE-specific data within aggregated data for the UECS 108.

When generating 302 the data signal at the PHY layer 182, the base station scrambles a CRC for the aggregated downlink data using the UECS-RNTI, and includes the scrambled CRC with the aggregated downlink data in the data signal. The base station 114 then transmits 306 the data signal including the aggregated downlink data and scrambled CRC to the UECS 108 on a downlink data channel (e.g., a Physical Downlink Shared Channel (PDSCH)). Similar to the control signal discussed previously with respect to 210, each UE of the UECS 108, including the master UE 102, the joint-receiver UE 104, and the UE 106, can receive the same data signal (channel conditions permitting), with the UECS 108 effectively operating as a distributed antenna receiver. Each of the UE 106, the joint-receiver UE 104, and the master UE 102 generates (308, 310, and 312, respectively) I/Q samples by demodulating the data signal. Even if a particular UE in the UECS 108 is not a target UE (i.e., there is no data in the aggregated downlink data intended for the particular UE), the particular UE can still help the UECS 108 to receive the data signal.

With continued reference to FIG. 3, the UE 106 transmits 314 its I/Q samples to the joint-receiver UE 104, and the master UE 102 transmits 316 its I/Q samples to the joint-receiver UE 104, via the local wireless network. After the joint-receiver UE 104 receives the I/Q samples from the other UEs 102, 106, the joint-receiver UE 104 decodes 318 the aggregated downlink data by jointly processing the I/Q samples received from the UEs 102, 106 together with the I/Q samples that the joint-receiver UE 104 itself generated at 310. Similar to 222, to decode 318 the aggregated downlink data, the joint-receiver UE 104 first time-aligns and consolidates the I/Q samples to obtain a stronger combined signal. The joint-receiver UE 104 can then decode the aggregated downlink data by using the UECS-RNTI to de-scramble the CRC.

After the joint-receiver UE 104 decodes 318 the aggregated downlink data, the UEs of the UECS 108 may extract and/or distribute the downlink data for each UE in a variety of ways, depending on the implementation or scenario. In the implementation shown in FIG. 3, the joint-receiver UE 104 transmits 320 the aggregated downlink data to the master UE 102 via the local wireless network, and the master UE 102 functions as a distributing UE. In other scenarios, the joint-receiver UE 104 does not transmit the aggregated downlink data to the master UE 102, and the joint-receiver UE 104 itself functions as the distributing UE. The master UE 102 may assign the joint-receiver UE 104 to be the distributing UE, or the master UE 102 may assign a different UE of the UECS 108, such as the UE 106, to be the distributing UE, depending on power, processing capability, and/or other suitable considerations. Events 308 through 320 are collectively referred to in FIG. 3 as event 325.

In the example scenario 300, in which the master UE 102 is acting as the distributing UE, the master UE 102 extracts 326 the data for each target UE using the UE-specific identities, at the upper layer 184 that corresponds to those UE-specific identities (i.e., the upper layer 184). For example, when extracting 326 data for the joint-receiver UE 104, the master UE 102 utilizes the UE-specific identity corresponding to the joint-receiver UE 104 to identify the location of the data for the joint-receiver UE 104 within the aggregated downlink data. Similarly, when extracting 326 data for the UE 106, the master UE 102 utilizes the UE-specific identity corresponding to the UE 106 to identify the location of the data for the UE 106 within the aggregated downlink data. The master UE 102 then transmits (328, 330) the extracted data for each of the joint-receiver UE 104 and the UE 106 to the joint-receiver UE 104 and the UE 106, respectively. As mentioned previously, the joint-receiver UE 104 may be the distributing UE instead of the master UE 102, in which case the joint-receiver UE 104 extracts the data for each of the master UE 102 and the UE 106, and transmits the extracted data to the master UE 102 and the UE 106, respectively.

Figure 4:
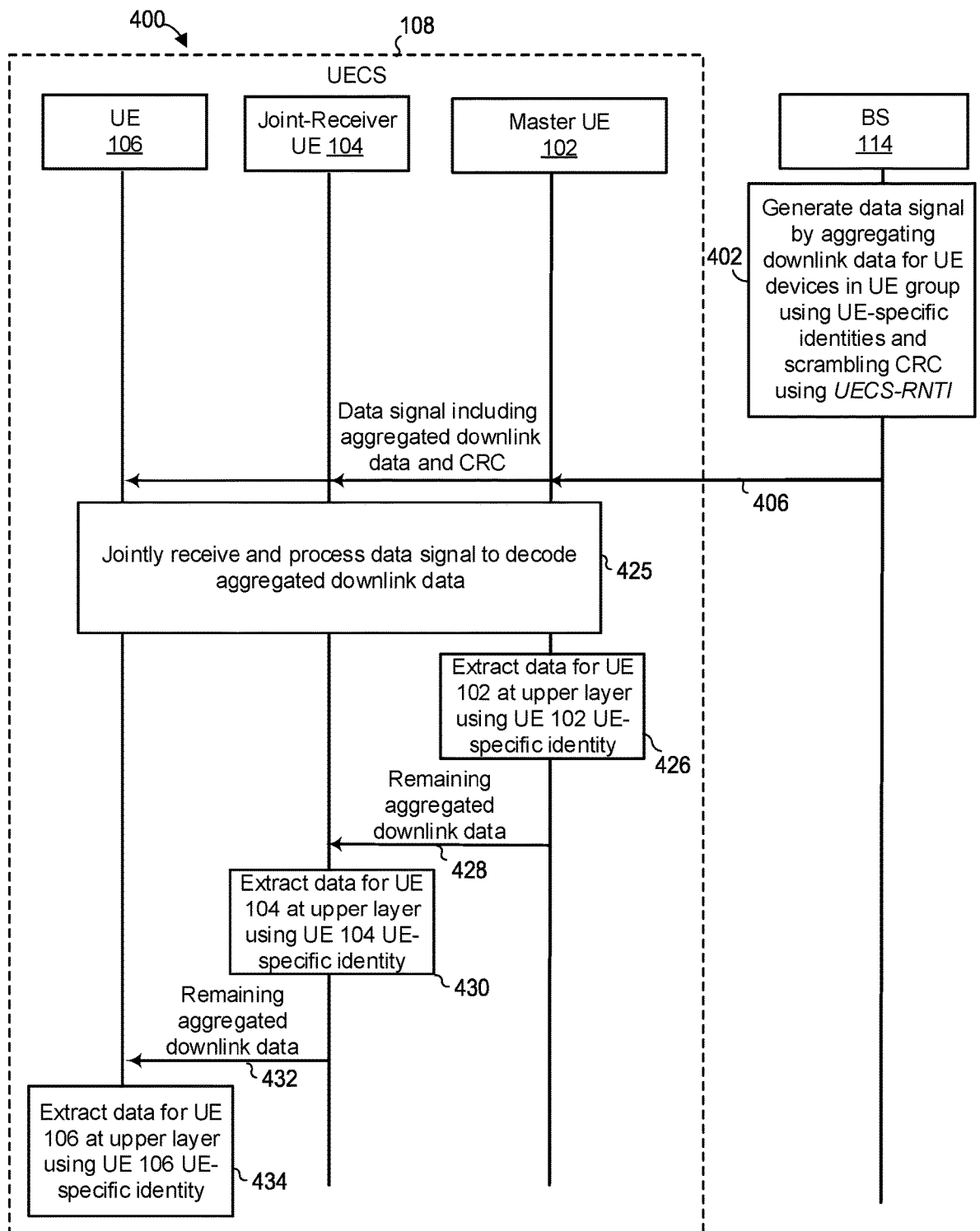
FIG. 4 is a messaging diagram of an alternative implementation and/or alternative scenario in which the base station transmits a data signal containing aggregated downlink data to the UECS on a single downlink data channel, and the UECS self-distributes the aggregated downlink data.

FIG. 4 is a messaging diagram of another scenario 400, corresponding to a different implementation and/or different circumstances than the messaging diagram of FIG. 3, in which the UECS 108 self-distributes the aggregated downlink data in a different manner. In the scenario 400, the base station 114 generates 402 a data signal by aggregating downlink data for at least two target UEs in the UECS 108 using the UE-specific identities, and using the UECS-RNTI to scramble the CRC for the aggregated downlink data. Event 402 may be similar to event 302 of FIG. 3, for example. The base station 114 then transmits 406 the data signal, including the aggregated downlink data and the scrambled CRC, to the UECS 108. Event 406 may be similar to event 306, for example. The UEs of the UECS 108 then jointly receive and process the data signal in order to decode the aggregated downlink data at an event 425, which may be similar to event 325 of FIG. 3, for example.

In scenario 400, and unlike scenario 300, the master UE 102 (acting as the distributing UE) extracts 426 the data only for itself using its own UE-specific identity (at the upper layer 184). The master UE 102 then transmits 428 the remaining aggregated downlink data to the joint-receiver UE 104, or any other UE in the UECS 108, via the local wireless network. The joint-receiver UE 104 then extracts 430 the data for itself using its own UE-specific identity. Next, the joint-receiver UE 104 transmits 432 the remaining aggregated downlink data to the UE 106, or any third UE in the UECS 108, which similarly extracts 434 its own data using its own UE-specific identity. If there are additional UEs in the UECS 108, the UE 106 forwards any remaining aggregated downlink data to one of those additional UEs, and so on. Each UE that extracts its own aggregated downlink data may use any suitable technique to determine which UE should receive the remaining data (e.g., transmit to a UE in the UECS 108 that is known to be nearby, or randomly choose another UE in the UECS 108 that has data in the remaining aggregated downlink data, etc.).

While FIG. 3 and FIG. 4 depict two example distribution techniques the UECS 108 may use to extract and distribute data to the UEs of the UECS 108, other techniques are also possible. For example, the distributing (master, joint-receiver, or other) UE may forward all of the aggregated downlink data to the other UEs, without first removing its own data as in event 426. As another example, the distributing UE may forward particular subsets of UE-specific data to certain (e.g., in near-range) UEs, while transmitting the remainder of the aggregated downlink data to the UECS 108 as a whole (e.g., to any UEs of the UECS 108 that are currently within local wireless range of the distributing UE).

In addition to acting as a distributed antenna receiver for receiving downlink transmissions, the UECS 108 acts as a distributed antenna transmitter for uplink transmissions. Moreover, in addition to scheduling aggregated downlink data for the UECS 108 via a single control channel (e.g., PDCCH), the base station 114 may schedule aggregated uplink data for the UECS 108 via the single control channel, as will now be discussed with reference to FIG. 5.

Figure 5:
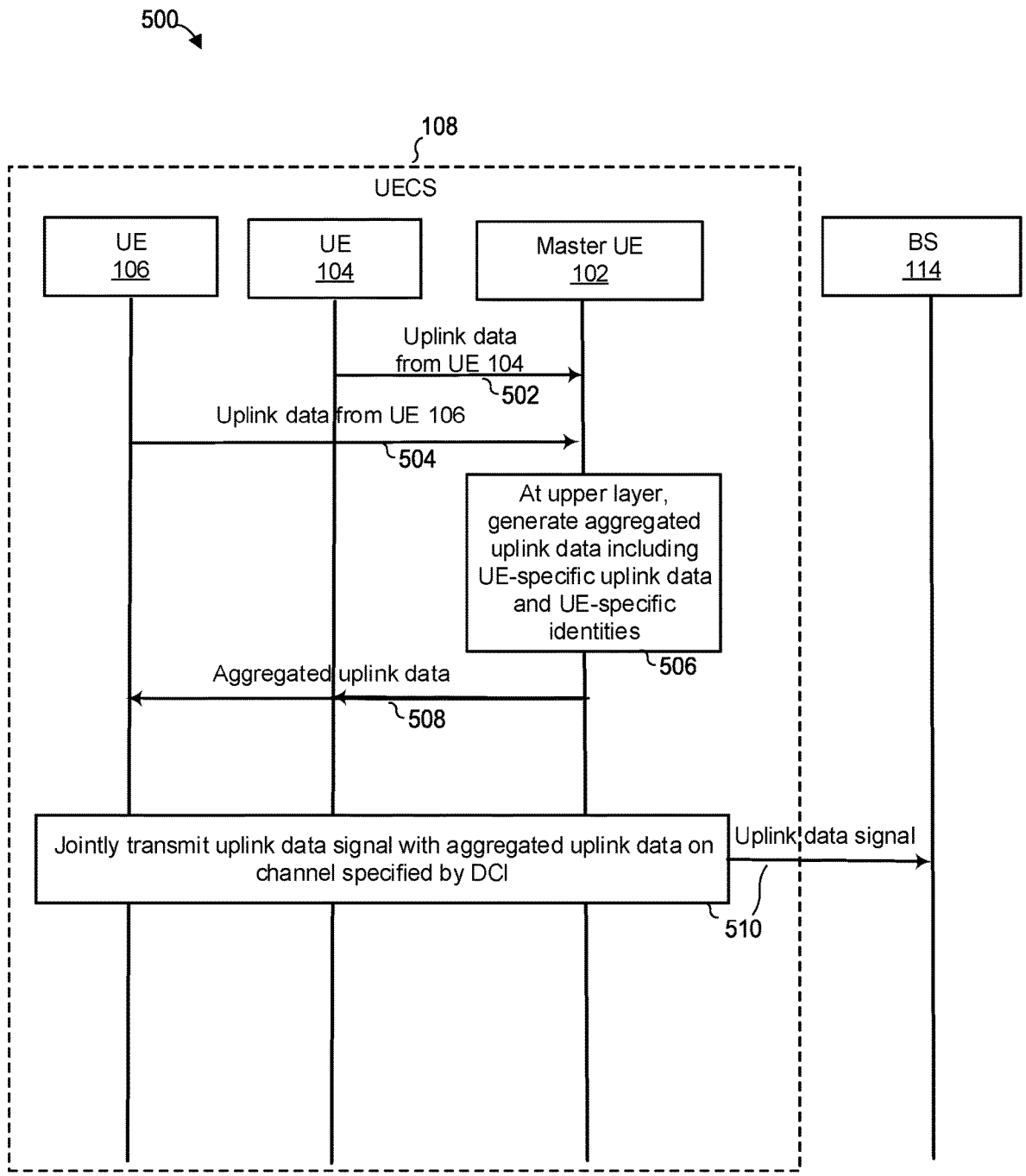
FIG. 5 is a messaging diagram of an example scenario in which the UEs of a UECS aggregate UE-specific uplink data and transmit a data signal containing the aggregated uplink data to the base station.

In FIG. 5, in an example scenario 500, the UEs 104 and 106 transmit (502, 504) respective uplink data to the master UE 102 via the local wireless network. The UEs 104 and 106, and any other UEs of the UECS 108 with uplink data to transmit to the base station 114, may be referred to as "source" UEs. If a source UE of the UECS 108, for example UE 106, has a poor connection with the master UE 102 but can connect to another UE (e.g., UE 104) via the local wireless network, the source UE may instead transmit its uplink data to the other UE (e.g., UE 104), which may in turn forward the uplink data to the master UE 102. While FIG. 5 depicts a scenario 500 in which the master UE 102 collects the uplink data from the other UEs, in other scenarios the master UE 102 may assign another UE the role of collecting and aggregating uplink data from the UEs of the UECS 108, such as a joint-receiver UE.

After receiving the uplink data from the source UEs, the master UE 102 generates 506 aggregated uplink data by aggregating the uplink data flows at the upper layer 184 using the UE-specific identities. Similar to how the base station 114 aggregates (302, 402) downlink data, the master UE 102 includes the UE-specific identity for each respective source UE within the aggregated uplink data to indicate the respective locations of the UE-specific uplink data within the aggregated data.

While not shown in FIG. 5, in some implementations, the master UE 102 aggregates the uplink data flows based on the Quality of Service (QoS) level associated with each individual uplink data flow. For example, the master UE 102 may prioritize the aggregation of uplink data from each UE according to the QoS associated with the data (e.g., with the QoS being based on the UE that sourced the data, and/or based on a type or characteristic of the data itself). The master UE 102 can aggregate uplink data flows associated with the same or similar QoS level into different subsets of data, and place the subsets into different queues depending on their QoS levels. The master UE 102 can then prioritize transmission of the different subsets of data by, for example, aggregating and transmitting data from a high-QoS queue before aggregating and transmitting data from a low-QoS queue.

After generating 506 the aggregated uplink data, the master UE 102 transmits 508 the aggregated uplink data, via the local wireless network, to the other UEs in the UECS 108, including the UE 104 and the UE 106, so that the other UEs may assist with joint transmission. The master UE 102 may transmit 508 the aggregated uplink data to all of the other UEs in the UECS 108, including any UEs that are not source UEs and do not have uplink data within the aggregated uplink data. In some scenarios, the master UE 102 may transmit the aggregated uplink data to just one other UE, such as a joint-receiver UE, and this UE transmits the aggregated uplink data to all other UEs or to one other UE in the UECS 108. In other scenarios, for example if all other UEs in the UECS 108 are suffering from highly degraded channel conditions, the master UE 102 alone may transmit an uplink data signal including the aggregated uplink data directly to the base station 114.

In the scenario 500, however, the UECS 108 acts as a distributed antenna transmitter to jointly transmit 510 the uplink data signal, including the aggregated uplink data, on the uplink data channel specified by the DCI. The UECS 108 can transmit 510 the uplink data signal to the base station 114 via a Physical Uplink Shared Channel (PUSCH) occasion that the base station 114 grants to the UECS 108, or that the UECS 108 jointly obtains via a random access procedure, for example. In some implementations, the UECS 108 jointly transmits 510 the uplink data signal to the base station 114 on an uplink data channel that was specified by the DCI decoded at event 222 of FIG. 2. In this way, both aggregated downlink data and aggregated uplink data may be received/transmitted in accordance with the DCI received on the downlink control channel.

Depending on the implementation and/or scenario, the joint transmission 510 may include all UEs in the UECS 108 transmitting a copy of the same uplink data signal, may include different UEs transmitting different uplink data signals, or may include some combination thereof. If multiple-input multiple-output (MIMO) techniques are used, for example, different UEs of the UECS 108 may transmit different uplink data signals.

While not shown in FIG. 5, in some implementations, the UECS 108 also jointly transmits uplink control signals to the base station 114. For example, the master UE 102 can transmit uplink control information for the UECS 108, via the local wireless network, to the other UEs in the UECS 108 (e.g., in a manner similar to event 508). The UECS 108 can then act as a distributed antenna transmitter to jointly transmit an uplink control signal for the UECS 108 to the base station 114 (e.g., in a manner similar to event 510).

Figure 6:
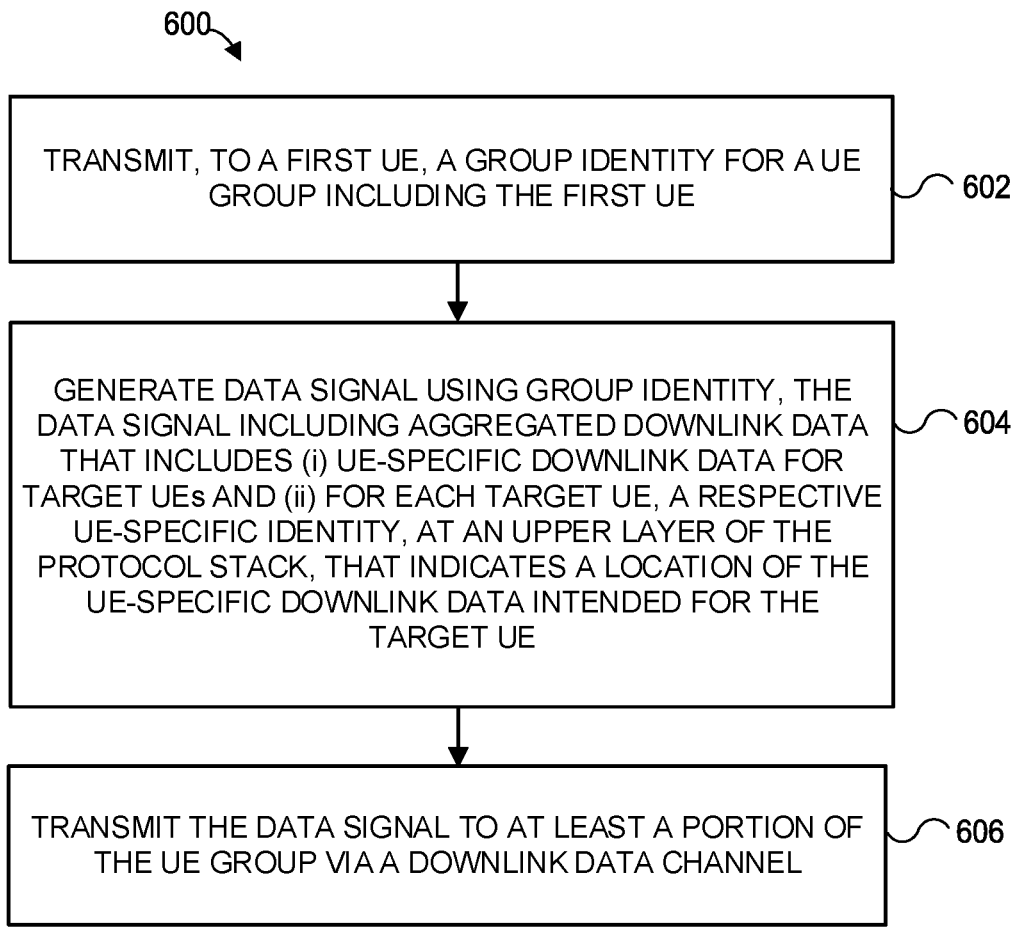
FIG. 6 is a flow diagram of an example method for transmitting a data signal containing aggregated downlink data to a UECS, which can be implemented in the base station of FIG. 1.

FIG. 6 illustrates a flow diagram of an example method 600 for transmitting a data signal containing aggregated downlink data to a UE group (e.g., the UECS 108), which can be implemented in the base station 114 of FIG. 1. The method 600 begins at block 602, where the base station 114 transmits a group identity for a UE group to a first UE in the UE group (e.g., event 202 in FIG. 2). The group identity can be, for example, a UECS-RNTI, and may be a PHY layer 182 identity.

At block 604, the base station 114 generates a data signal using the group identity (e.g., event 302 in FIG. 3 or event 402 in FIG. 4). The data signal includes at least aggregated downlink data. The aggregated downlink data includes both (i) UE-specific downlink data for at least two target UEs in the UE group and (ii) for each target UE, a respective UE-specific identity, at an upper layer of a protocol stack (e.g., the upper layer 184 of the protocol stack 180), that indicates a location of the UE-specific downlink data intended for the target UE within the aggregated downlink data.

At block 606, the base station 114 transmits the data signal including the aggregated downlink data to at least a portion of the UE group via a downlink data channel (e.g., event 306 in FIG. 3 or event 406 in FIG. 4).

Figure 7:
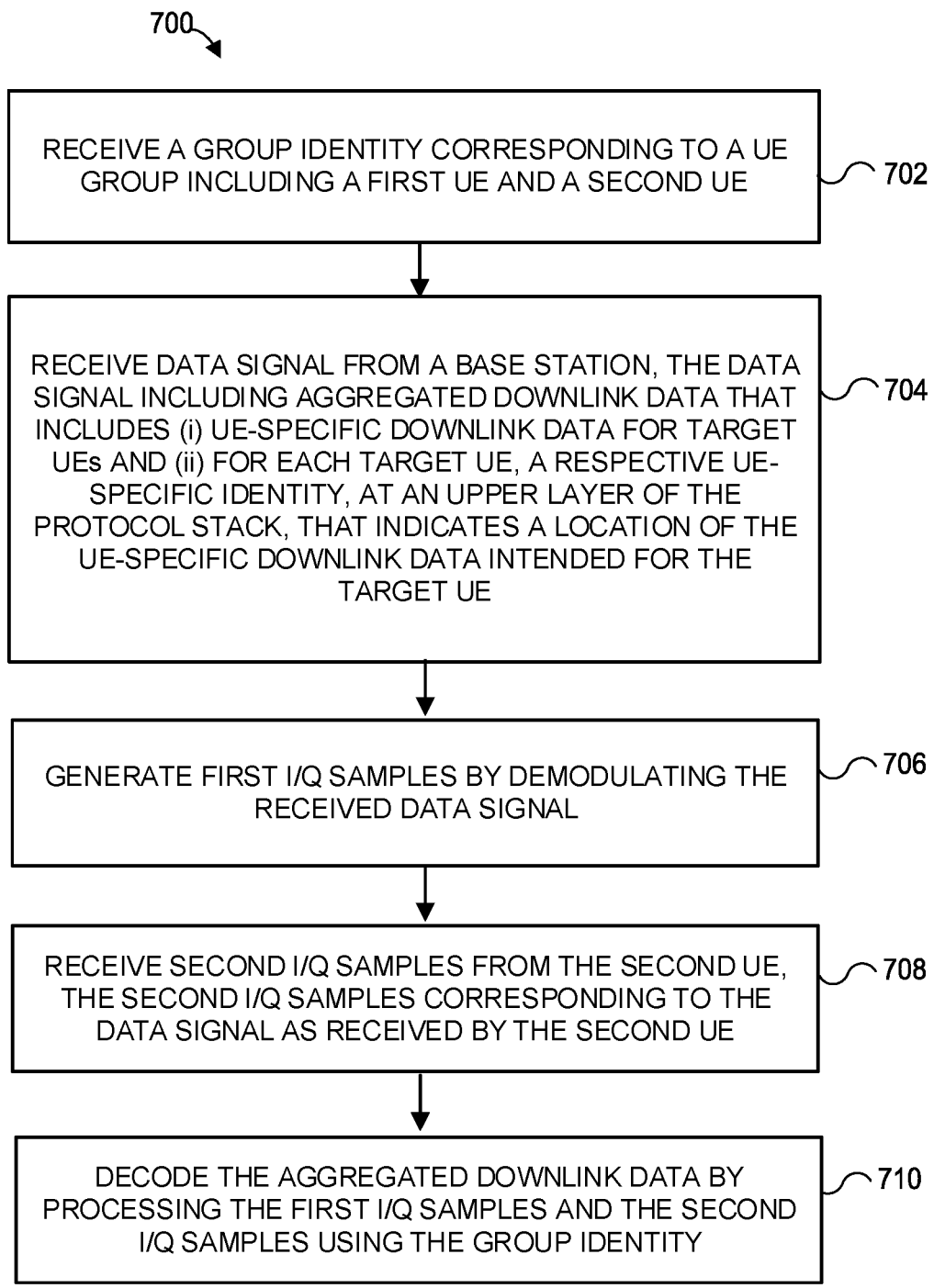
FIG. 7 is a flow diagram of an example method for receiving and decoding a data signal including aggregated downlink data for different UEs of a UECS, which can be implemented in a UE of FIG. 1.

FIG. 7 is a flow diagram of an example method 700 for receiving and decoding a data signal including aggregated downlink data for different UEs of a UE group (e.g., the UECS 108), which can be implemented in a UE of FIG. 1, such as the UE 106, the UE 104, or the UE 102. For ease of explanation, the following paragraphs refer to the UE 102 as performing the method 700, but it is understood that any UE of the UECS 108 may perform the method 700.

At block 702, the UE 102 receives a group identity corresponding to a UE group, such as the UECS 108, including the UE 102 and at least one other UE (e.g., event 202 of FIG. 2). The group identity can be, for example, a UECS-RNTI, and may be a PHY layer 182 identity. The UE 102 receives the group identity from a wireless transmitter, which may be a wireless transmitter of the base station 114, or a wireless transmitter of a UE of the UECS 108 that is acting as the master UE, for example.

At block 704, the UE 102 receives a data signal from the base station 114 on a downlink data channel (e.g., event 306 in FIG. 3 or event 406 in FIG. 4). The data signal includes aggregated downlink data, which in turn includes (i) UE-specific downlink data for at least two target UEs in the UE group, and (ii) for each target UE, a respective UE-specific identity, at an upper layer of the protocol stack (e.g., the upper layer 184 of the protocol stack 180), that indicates a location of the UE-specific downlink data intended for the target UE within the aggregated downlink data.

At block 706, the UE 102 generates first I/Q samples by demodulating the received data signal (e.g., event 308, 310, or 312 of FIG. 3, or event 425 of FIG. 4). At block 708, the UE 102 receives second I/Q samples from a second UE, the I/Q samples corresponding to the data signal as received by the second UE (e.g. event 314 or 316 of FIG. 3, or event 425 of FIG. 4). Further, at block 710, the UE 102 decodes the aggregated downlink data by processing at least the first and second I/Q samples using the group identity (e.g., event 318 of FIG. 3 or event 425 of FIG. 4). For example, the UE 102 may descramble a CRC of the aggregated downlink data using the UECS-RNTI.

Aspects

By way of example, and not limitation, the disclosure herein contemplates at least the following aspects:

Aspect 1—A method, in a base station supporting a protocol stack, for increasing network efficiency, the method comprising: transmitting, to at least a first user equipment (UE), a group identity for a group of two or more UEs that includes the first UE; generating, by processing hardware of the base station and using the group identity, a data signal that includes aggregated downlink data, wherein the aggregated downlink data includes (i) UE-specific downlink data for at least two target UEs within the group and (ii) for each target UE of the at least two target UEs, a respective UE-specific identity, at an upper layer of the protocol stack, that indicates a location of the UE-specific downlink data intended for the target UE within the aggregated downlink data; and transmitting the data signal to at least a portion of the group via a downlink data channel.

Aspect 2—The method of aspect 1, wherein the upper layer is a packet data convergence protocol (PDCP) layer and the data signal includes a PDCP protocol data unit (PDCP PDU) containing the aggregated downlink data; or the upper layer is a radio link control (RLC) layer and the data signal includes an RLC protocol data unit (RLC PDU) containing the aggregated downlink data.

Aspect 3—The method of aspect 1, wherein the upper layer is a medium access control (MAC) layer and the data signal includes a MAC protocol data unit (MAC PDU) containing the aggregated downlink data.

Aspect 4—The method of any one of aspects 1-3, wherein generating the data signal includes scrambling information within the data signal using the group identity.

Aspect 5—The method of any one of aspects 1-4, wherein generating the data signal includes scrambling a cyclic redundancy check (CRC) associated with the aggregated downlink data using the group identity.

Aspect 6—The method of any one of aspects 1-5, further comprising, before transmitting the data signal: generating, by the processing hardware and using the group identity, a control signal that includes downlink control information for the group, the downlink control information defining at least a portion of the downlink data channel; and transmitting the control signal to at least a portion of the group via a downlink control channel.

Aspect 7—The method of aspect 6, wherein generating the control signal includes scrambling information within the control signal using the group identity.

Aspect 8—The method of any one of aspects 6-7, wherein generating the control signal includes scrambling a cyclic redundancy check (CRC) associated with the downlink control information using the group identity.

Aspect 9—The method of any one of aspects 6-8, further comprising: scheduling both uplink data and downlink data for the group via the downlink control channel.

Aspect 10—The method of any one of aspects 6-9, further comprising: receiving, from one or more UEs of the group and via an uplink data channel defined at least in part by the downlink control information, aggregated uplink data that includes (i) UE-specific uplink data for a plurality of source UEs of the group and (ii) for each source UE of the plurality of source UEs, the respective UE-specific identity, at the upper layer, that indicates a location of the UE-specific uplink data for the source UE within the aggregated uplink data.

Aspect 11—The method of any one of aspects 1-10, further comprising: associating the aggregated downlink data to only one data radio bearer.

Aspect 12—The method of any one of aspects 1-11, further comprising: configuring the group to share a same radio resource control (RRC) layer state.

Aspect 13—The method of any one of aspects 1-12, further comprising: configuring the group to share a same discontinuous reception (DRX) cycle.

Aspect 14—The method of any one of aspects 1-13, further comprising: configuring the group to share a same semi-persistent scheduling.

Aspect 15—The method of any one of aspects 1-14, further comprising: determining, by the processing hardware, a first antenna port for the first UE and a second antenna port for a second UE of the group.

Aspect 16—The method of aspect 15, further comprising: causing the first UE to perform one or more first operations by transmitting, to the group, a first command associated with the first antenna port; and causing the second UE to perform one or more second operations by transmitting, to the group, a second command associated with the second antenna port.

Aspect 17—The method of aspect 16, wherein the first command and the second command are different transmit power control commands.

Aspect 18—The method of aspect 16, wherein the first command and the second command are different timing advance commands.

Aspect 19—The method of any one of aspects 15-18, further comprising: causing the first UE to perform a first channel sounding process by transmitting, to the group, a first channel sounding process configuration associated with the first antenna port; and causing the second UE to perform a second channel sounding process by transmitting, to the group, a second channel sounding process configuration associated with the second antenna port.

Aspect 20—A base station comprising hardware and configured to perform the method of any one of aspects 1-19.

Aspect 21—A method, in a first user equipment (UE) supporting a protocol stack, for increasing network efficiency, the method comprising: receiving, from a wireless transmitter, a group identity corresponding to a group of two or more UEs that includes the first UE and a second UE; receiving, from a base station on a downlink data channel, a data signal including aggregated downlink data, wherein the aggregated downlink data includes (i) UE-specific downlink data for at least two target UEs within the group and (ii) for each target UE of the at least two target UEs, a respective UE-specific identity, at an upper layer of the protocol stack, that indicates the location of the UE-specific downlink data intended for the target UE within the aggregated downlink data; generating, by processing hardware of the first UE, first I/Q samples by demodulating the received data signal; receiving, from the second UE via a local wireless network, second I/Q samples corresponding to the data signal as received by the second UE; and decoding, by the processing hardware, the aggregated downlink data by processing at least the first I/Q samples and the second I/Q samples using the group identity.

Aspect 22—The method of aspect 21, wherein: the upper layer is a packet data convergence protocol (PDCP) layer and the data signal includes a PDCP protocol data unit (PDCP PDU) containing the aggregated downlink data; or the upper layer is a radio link control (RLC) layer and the data signal includes an RLC protocol data unit (RLC PDU) containing the aggregated downlink data.

Aspect 23—The method of aspect 21, wherein the upper layer is a medium access control (MAC) layer and the data signal includes a MAC protocol data unit (MAC PDU) containing the aggregated downlink data.

Aspect 24—The method of any one of aspects 21-23, wherein decoding the aggregated downlink data includes using the group identity to de-scramble a cyclic redundancy check (CRC) associated with the aggregated downlink data.

Aspect 25—The method of any one of aspects 21-24, further comprising, before receiving the data signal: receiving, from the base station via a downlink control channel, a control signal that includes downlink control information for the group; generating, by the processing hardware, third I/Q samples by demodulating the received control signal; receiving, from a third UE via the local wireless network, fourth I/Q samples corresponding to the control signal as received by the second UE; and decoding, by the processing hardware, the downlink control information by processing at least the third I/Q samples and the fourth I/Q samples using the group identity, wherein receiving the data signal includes receiving the data signal via a downlink data channel defined at least in part by the downlink control information.

Aspect 26—The method of aspect 25, wherein the third UE is the second UE.

Aspect 27—The method of any one of aspects 25-26, wherein decoding the downlink control information includes using the group identity to de-scramble a cyclic redundancy check (CRC) associated with the downlink control information.

Aspect 28—The method of any one of aspects 25-27, wherein the first UE is a master UE of the group, and further comprising: receiving uplink data from one or more other UEs of the group via the local wireless network; generating, by the processing hardware, aggregated uplink data by aggregating, at the upper layer, uplink data from a plurality of source UEs within the group, wherein the aggregated uplink data includes (i) UE-specific uplink data for the plurality of source UEs and (ii) for each source UE of the plurality of source UEs, the respective UE-specific identity, at the upper layer, to indicate the location of the UE-specific uplink data for the source UE within the aggregated uplink data; and transmitting the aggregated uplink data to the base station via an uplink data channel defined at least in part by the downlink control information.

Aspect 29—The method of aspect 28, wherein generating the aggregating uplink data includes: determining, by the processing hardware, a subset of uplink data from the plurality of source UEs that corresponds to a same quality of service level; and prioritizing the subset of uplink data from the plurality of source UEs.

Aspect 30—The method of any one of aspects 28-29, further comprising: before transmitting the aggregated uplink data to the base station, transmitting the aggregated uplink data to at least one other UE in the group to enable joint transmission of the aggregated uplink data.

Aspect 31—The method of any one of aspects 25-27, further comprising: receiving aggregated uplink data from a master UE of the group via the local wireless network, wherein the aggregated uplink data includes (i) UE-specific uplink data for one or more other source UEs of the group, and (ii) for each source UE of the one or more source UEs, the respective UE-specific identity, at the upper layer, to indicate the location of the UE-specific uplink data for the source UE within the aggregated uplink data; and transmitting the aggregated uplink data to the base station.

Aspect 32—The method of aspect 31, further comprising, before receiving aggregated uplink data from the master UE, transmitting UE-specific uplink data for the first UE to the master UE via the local wireless network.

Aspect 33—The method of any one of aspects 21-27, 31, or 32, further comprising, after decoding the aggregated downlink data: transmitting, via the local wireless network, the decoded aggregated downlink data to at least one other UE of the group.

Aspect 34—The method of aspect 33, wherein the transmitting the decoded aggregated downlink data comprises transmitting only to a master UE of the group to enable distribution, by the master UE, of the UE-specific downlink data for the at least two target UEs.

Aspect 35—The method of aspect 33, wherein the transmitting the decoded aggregated downlink data comprises transmitting to the at least two target UEs.

Aspect 36—The method of any one of aspects 21-33, further comprising, after decoding the aggregated downlink data: extracting from the decoded aggregated downlink data, by the processing hardware, UE-specific downlink data intended for the first UE; and transmitting, via the local wireless network, a remaining portion of the decoded aggregated downlink data to at least one other UE of the group.

Aspect 37—The method of any one of aspects 21-33, further comprising, after decoding the aggregated downlink data: extracting from the decoded aggregated downlink data, by the processing hardware, UE-specific downlink data intended for the second UE; and transmitting to the second UE, via the local wireless network, the UE-specific downlink data intended for the second UE.

Aspect 38—The method of any one of aspects 21-37, wherein the wireless transmitter is a wireless transmitter of (i) the base station, or (ii) a master UE of the group.

Aspect 39—The method of any one of aspects 21-38, wherein the aggregated downlink data is associated with only one data radio bearer.

Aspect 40—The method of any one of aspects 21-39, further comprising: sharing a same radio resource control (RRC) layer state with all other UEs in the group.

Aspect 41—The method of any one of aspects 21-40, further comprising: sharing a same discontinuous reception (DRX) cycle with all other UEs in the group.

Aspect 42—The method of any one of aspects 21-41, further comprising: sharing a same semi-persistent scheduling with all other UEs in the group.

Aspect 43—The method of any one of aspects 21-24, further comprising: receiving, from the base station via a downlink control channel, a control signal that includes a plurality of commands for a plurality of respective antenna ports; generating, by the processing hardware, third I/Q samples by demodulating the received control signal; receiving, from a third UE via the local wireless network, fourth I/Q samples corresponding to the control signal as received by the second UE; and decoding, by the processing hardware, the plurality of commands by processing at least the third I/Q samples and the fourth I/Q samples using the group identity.

Aspect 44—The method of aspect 43, wherein the third UE is the second UE.

Aspect 45—The method of any one of aspects 43-44, further comprising: identifying, by the processing hardware and within the decoded plurality of commands, a first command for an antenna port associated with the first UE; and performing one or more operations in response to the first command.

Aspect 46—The method of aspect 45, wherein: the plurality of commands is a plurality of transmit power control commands; the first command is a first power control command; and performing the one or more operations includes modifying or maintaining a transmit power level in accordance with the first power control command.

Aspect 47—The method of aspect 45, wherein: the plurality of commands is a plurality of timing advance commands; the first command is a first timing advance command; and performing the one or more operations includes modifying or maintaining an uplink transmission timing in accordance with the first timing advance command.

Aspect 48—The method of any one of aspects 21-24, further comprising: receiving, from the base station via a downlink control channel, a control signal that includes a plurality of channel sounding process configurations for a plurality of respective antenna ports; generating, by the processing hardware, third I/Q samples by demodulating the received control signal; receiving, from the second UE via the local wireless network, fourth I/Q samples corresponding to the control signal as received by the second UE; and decoding, by the processing hardware, the plurality of channel sounding process configurations by processing at least the third I/Q samples and the fourth I/Q samples using the group identity.

Aspect 49—The method of aspect 48, further comprising: identifying, by the processing hardware and within the decoded plurality of channel sounding process configurations, a first channel sounding process configuration for an antenna port associated with the first UE; and performing a channel sounding process in accordance with the first channel sounding process configuration.

Aspect 50—The method of aspect 21, wherein the first UE is a master UE of the group, and further comprising: after receiving the group identity and before receiving the data signal, transmitting the group identity to at least one other UE of the group via the local wireless network.

Aspect 51—The method of aspect 21, wherein: the second UE is a master UE of the group; and the method comprises receiving the group identity from the master UE via the local wireless network.

Aspect 52—A UE comprising hardware and configured to perform the method of any one of aspects 21-51.

Additional Considerations

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method, in a base station supporting a protocol stack, the method comprising:
   transmitting, to at least a first user equipment (UE), a group identity for a group of two or more UEs that includes the first UE;
   generating, by processing hardware of the base station and using the group identity, a data signal that includes aggregated downlink data, wherein
      the aggregated downlink data includes (i) UE-specific downlink data for at least two target UEs within the group and (ii) for each target UE of the at least two target UEs, a respective UE-specific identity, at an upper layer of the protocol stack, that indicates a location of the UE-specific downlink data intended for the target UE within the aggregated downlink data; and
   transmitting the data signal to at least a portion of the group via a downlink data channel.

2. The method of claim 1, wherein:
   the upper layer is a packet data convergence protocol (PDCP) layer and the data signal includes a PDCP protocol data unit (PDCP PDU) containing the aggregated downlink data; or
   the upper layer is a radio link control (RLC) layer and the data signal includes an RLC protocol data unit (RLC PDU) containing the aggregated downlink data.

3. The method of claim 1, wherein the upper layer is a medium access control (MAC) layer and the data signal includes a MAC protocol data unit (MAC PDU) containing the aggregated downlink data.

4. The method of claim 1, wherein generating the data signal includes scrambling information within the data signal using the group identity.

5. The method of claim 1, further comprising, before transmitting the data signal:
   generating, by the processing hardware and using the group identity, a control signal that includes downlink control information for the group, the downlink control information defining at least a portion of the downlink data channel; and
   transmitting the control signal to at least a portion of the group via a downlink control channel.

6. The method of claim 5, further comprising:
   receiving, from one or more UEs of the group and via an uplink data channel defined at least in part by the downlink control information, aggregated uplink data that includes (i) UE-specific uplink data for a plurality of source UEs of the group and (ii) for each source UE of the plurality of source UEs, the respective UE-specific identity, at the upper layer, that indicates a location of the UE-specific uplink data for the source UE within the aggregated uplink data.

7. A base station comprising hardware and configured to:
   transmit, to at least a first user equipment (UE), a group identity for a group of two or more UEs that includes the first UE;
   generate, using the group identity, a data signal that includes aggregated downlink data, wherein
      the aggregated downlink data includes (i) UE-specific downlink data for at least two target UEs within the group and (ii) for each target UE of the at least two target UEs, a respective UE-specific identity, at an upper layer of the protocol stack, that indicates a location of the UE-specific downlink data intended for the target UE within the aggregated downlink data; and
   transmit the data signal to at least a portion of the group via a downlink data channel.

8. The base station of claim 7, wherein:
   the upper layer is a packet data convergence protocol (PDCP) layer and the data signal includes a PDCP protocol data unit (PDCP PDU) containing the aggregated downlink data; or
   the upper layer is a radio link control (RLC) layer and the data signal includes an RLC protocol data unit (RLC PDU) containing the aggregated downlink data.

9. The base station of claim 7, wherein the upper layer is a medium access control (MAC) layer and the data signal includes a MAC protocol data unit (MAC PDU) containing the aggregated downlink data.

10. The base station of claim 7, wherein the base station is configured to generate the data signal including by:
   scrambling information within the data signal using the group identity.

11. The base station of claim 7, wherein the base station is further configured to, before transmitting the data signal:
   generate, using the group identity, a control signal that includes downlink control information for the group, the downlink control information defining at least a portion of the downlink data channel; and
   transmit the control signal to at least a portion of the group via a downlink control channel.

12. The base station of claim 11, wherein the base station is further configured to:
receive, from one or more UEs of the group and via an uplink data channel defined at least in part by the downlink control information, aggregated uplink data that includes (i) UE-specific uplink data for a plurality of source UEs of the group and (ii) for each source UE of the plurality of source UEs, the respective UE-specific identity, at the upper layer, that indicates a location of the UE-specific uplink data for the source UE within the aggregated uplink data.

13. A method, in a first user equipment (UE) supporting a protocol stack, the method comprising:
receiving, from a wireless transmitter, a group identity corresponding to a group of two or more UEs that includes the first UE and a second UE;
receiving, from a base station on a downlink data channel, a data signal including aggregated downlink data, wherein
the aggregated downlink data includes (i) UE-specific downlink data for at least two target UEs within the group and (ii) for each target UE of the at least two target UEs, a respective UE-specific identity, at an upper layer of the protocol stack, that indicates the location of the UE-specific downlink data intended for the target UE within the aggregated downlink data;
generating, by processing hardware of the first UE, first I/Q samples by demodulating the received data signal;
receiving, from the second UE via a local wireless network, second I/Q samples corresponding to the data signal as received by the second UE; and
decoding, by the processing hardware, the aggregated downlink data by processing at least the first I/Q samples and the second I/Q samples using the group identity.

14. The method of claim 13, wherein:
the upper layer is a packet data convergence protocol (PDCP) layer and the data signal includes a PDCP protocol data unit (PDCP PDU) containing the aggregated downlink data;
the upper layer is a radio link control (RLC) layer and the data signal includes an RLC protocol data unit (RLC PDU) containing the aggregated downlink data; or
the upper layer is a medium access control (MAC) layer and the data signal includes a MAC protocol data unit (MAC PDU) containing the aggregated downlink data.

15. The method of claim 13, further comprising, before receiving the data signal:
receiving, from the base station via a downlink control channel, a control signal that includes downlink control information for the group;
generating, by the processing hardware, third I/Q samples by demodulating the received control signal;
receiving, from a third UE via the local wireless network, fourth I/Q samples corresponding to the control signal as received by the second UE; and
decoding, by the processing hardware, the downlink control information by processing at least the third I/Q samples and the fourth I/Q samples using the group identity,
wherein receiving the data signal includes receiving the data signal via a downlink data channel defined at least in part by the downlink control information.

16. The method of claim 15, wherein the first UE is a coordinating UE of the group, and further comprising:
receiving uplink data from one or more other UEs of the group via the local wireless network;
generating, by the processing hardware, aggregated uplink data by aggregating, at the upper layer, uplink data from a plurality of source UEs within the group, wherein the aggregated uplink data includes (i) UE-specific uplink data for the plurality of source UEs and (ii) for each source UE of the plurality of source UEs, the respective UE-specific identity, at the upper layer, to indicate the location of the UE-specific uplink data for the source UE within the aggregated uplink data; and
transmitting the aggregated uplink data to the base station via an uplink data channel defined at least in part by the downlink control information.

17. The method of claim 15, further comprising:
receiving aggregated uplink data from a coordinating UE of the group via the local wireless network, wherein the aggregated uplink data includes (i) UE-specific uplink data for one or more other source UEs of the group, and (ii) for each source UE of the one or more source UEs, the respective UE-specific identity, at the upper layer, to indicate the location of the UE-specific uplink data for the source UE within the aggregated uplink data; and
transmitting the aggregated uplink data to the base station.

18. The method of claim 13, further comprising, after decoding the aggregated downlink data:
transmitting, via the local wireless network, the decoded aggregated downlink data to at least one other UE of the group.

19. The method of claim 13, further comprising, after decoding the aggregated downlink data:
extracting from the decoded aggregated downlink data, by the processing hardware, UE-specific downlink data intended for the first UE; and
transmitting, via the local wireless network, a remaining portion of the decoded aggregated downlink data to at least one other UE of the group.

20. The method of claim 13, wherein decoding the aggregated downlink data includes using the group identity to de-scramble a cyclic redundancy check (CRC) associated with the aggregated downlink data.

* * * * *